United States Patent
Kuruvilla

(10) Patent No.: US 12,001,931 B2
(45) Date of Patent: Jun. 4, 2024

(54) SIMULTANEOUS HYPER PARAMETER AND FEATURE SELECTION OPTIMIZATION USING EVOLUTIONARY BOOSTING MACHINES

(71) Applicant: Allstate Insurance Company, Northbrook, IL (US)

(72) Inventor: Ousef Kuruvilla, Bangalore (IN)

(73) Assignee: Allstate Insurance Company, Northbrook, IL (US)

( * ) Notice: Subject to any disclaimer, the term of this patent is extended or adjusted under 35 U.S.C. 154(b) by 1105 days.

(21) Appl. No.: 16/219,242

(22) Filed: Dec. 13, 2018

(65) Prior Publication Data

US 2020/0134364 A1 Apr. 30, 2020

(30) Foreign Application Priority Data

Oct. 31, 2018 (IN) .............................. 201841041162

(51) Int. Cl.
*G06N 20/20* (2019.01)
*G06F 18/2115* (2023.01)
(Continued)

(52) U.S. Cl.
CPC ......... *G06N 20/20* (2019.01); *G06F 18/2115* (2023.01); *G06F 18/214* (2023.01); *G06N 3/126* (2013.01); *G06N 20/00* (2019.01)

(58) Field of Classification Search
CPC ........ G06N 20/20; G06N 3/126; G06N 20/00; G06N 5/01; G06F 18/2115; G06F 18/214
See application file for complete search history.

(56) References Cited

U.S. PATENT DOCUMENTS

| 8,131,039 B2 | 3/2012 | Krishnapuram et al. |
| 8,301,406 B2 | 10/2012 | Lee et al. |

(Continued)

FOREIGN PATENT DOCUMENTS

| CA | 2666027 A1 | 11/2009 |
| EP | 3113037 A1 | 1/2017 |

OTHER PUBLICATIONS

Ferrucci, A Framework for Genetic Algorithms Based on Hadoop, arXiv, 2013 (Year: 2013).*

(Continued)

*Primary Examiner* — Aniss Chad
*Assistant Examiner* — Shien Ming Chou
(74) *Attorney, Agent, or Firm* — Dinsmore & Shohl LLP

(57) ABSTRACT

Aspects relate to a machine learning system implementing an evolutionary boosting machine. The system may initially select randomized feature sets for an initial generation of candidate models. Evolutionary algorithms may be applied to the system to create later generations of the cycle, combining and mutating the feature selections of the candidate models. The system may determine optimal number of boosting iterations for each candidate model in a generation by building boosting iterations from an initial value up to a predetermined maximum number of boosting iterations. When a final generation is achieved, the system may evaluate the optimal model of the generation. If the optimal boosting iterations of the optimal model does not meet solution constraints on the optimal boosting iterations, the system may adjust a learning rate parameter and then proceed to the next cycle. Based on termination criteria, the system may determine a resulting/final optimal mode.

17 Claims, 5 Drawing Sheets

(51) Int. Cl.
*G06F 18/214* (2023.01)
*G06N 3/126* (2023.01)
*G06N 20/00* (2019.01)

(56) References Cited

U.S. PATENT DOCUMENTS

| | | | |
|---|---|---|---|
| 8,909,568 | B1 | 12/2014 | Mann et al. |
| 10,025,813 | B1 | 7/2018 | Gebremariam et al. |
| 2010/0161534 | A1 | 6/2010 | Sellamanickam et al. |
| 2015/0112874 | A1 | 4/2015 | Serio et al. |
| 2017/0109646 | A1 | 4/2017 | David |
| 2017/0261949 | A1 | 9/2017 | Hoffmann et al. |
| 2018/0018590 | A1 | 1/2018 | Szeto et al. |
| 2018/0101529 | A1 | 4/2018 | Karpistsenko et al. |
| 2018/0121814 | A1 | 5/2018 | Yu et al. |
| 2018/0240041 | A1 | 8/2018 | Koch et al. |

OTHER PUBLICATIONS

Jain, Hyperparameter tuning in XGBoost using genetic algorithm, Towards data science, Sep. 2018 (Year: 2018).*
Natekin, Gradient Boosting Machines, a Tutorial, Frontiers in Neurorobotics, 2013 (Year: 2013).*
Friedman, Greedy Function Approximation a Gradient Boosting Machine, the Annuals of Statistics 2001 vol. 29, No. 5, 1189-1232, 2001 (Year: 2001).*
Jeff Heaton, "Automated Feature Engineering for Deep Neural Networks with Genetic Programming", An Abstract of a Dissertation Submitted to Nova Southeastern University in Partial Fulfillment of the Requirements for the Degree of Doctor of Philosophy, 202 pages, 2017.
Sadanand Singh, "Understanding Boosted Trees Models", https://sadanand-singh.github.io/posts/boostedtrees/ website visited Aug. 27, 2018, pp. 1-18.
Tim O'Shea et al., "An Introduction to Deep Learning for the Physical Layer", pp. 1-13, Jul. 11, 2017.
Pablo Ribalta Lorenazo, et al., Abstract of "Particle swarm optimization for hyper-parameter selection in deep neural networks", published in GECCO '17 Proceedings of the Genetic and Evolutionary Computation Conference, pp. 481-488, Berlin Germany, Jul. 15-19, 2017.
Kuan-Yu Chen, Abstract of "Forecasting systems reliability based on support vector regression with genetic algorithms", Reliability Engineering & System Safety, vol. 92, Issue 4, Apr. 2007, pp. 423-432.
Dr. Tomás Horváth, et al., "Investigating the Importance of Meta-features for Classification Tasks in Meta-learning", Eötvös Lorand University Faculty of Informatics, pp. 1-66, Budapest, 2017.
Isabelle Guyon, et al. "An Introduction to Variable and Feature Selection", Journal of Machine Learning Research, vol. 3, pp. 1157-1182, Mar. 2003.
Edoardo Amaldi, et al., "On the approximability of minimizing nonzero variables or unsatisfied relations in linear systems", Theoretical Computer Science, vol. 209, pp. 237-260, 1998.
Thomas Back, "Evolutionary Algorithms", University of Dortmund, Department of Computer Science, Germany, pp. 26-31.
Philipp Koehn, "Combining Genetic Algorithms and Neural Networks: The Encoding Problem", Thesis Presented for the Master of Science Degree, the University of Tennessee, Knoxville, 67 pages, Dec. 1994.
G. Zhang, et al., "Multi-Level Decision Making Models, Methods and Applications", Intelligent Systems Reference Library 82, Springer-Verlag Berlin Heidelberg, pp. 25-46, 2015.
Kenneth O. Stanley, et al., "Efficient Evolution of Neural Network Topologies", Proceedings of the 2002 Congress on Evolutionary Computation (CEC '02). Piscataway, NJ: IEEE, 6 pages, 2002.
Jerome H. Friedman, "Stochastic Gradient Boosting", pp. 1-10, Mar. 26, 1999.
X. S. Yang, Optimization and Metaheuristic Algorithms in Engineering, in: Metaheursitics in Water, Geotechnical and Transport Engineering (Eds. X. S. Yang, A. H. Gandomi, S. Talatahari, A. H. Alavi), Elsevier, (2013), pp. 1-23.

\* cited by examiner

SIMULTANEOUS HYPER PARAMETER AND FEATURE SELECTION OPTIMIZATION USING EVOLUTIONARY BOOSTING MACHINES

CROSS REFERENCE TO RELATED APPLICATIONS

This Application claims priority from Indian Patent Application No. 201841041162, entitled "SIMULTANEOUS HYPER PARAMETER AND FEATURE SELECTION OPTIMIZATION USING EVOLUTIONARY BOOSTING MACHINES," filed on Oct. 31, 2018 in India, the entire contents of which are incorporated herein by reference in its entirety.

TECHNICAL FIELD

Aspects of the disclosure generally relate to machine learning. In particular, various aspects of the disclosure provide for optimizations in machine learning systems utilizing evolutionary algorithms, such as evolutionary boosting machines.

BACKGROUND

Modern computing devices have revolutionized our ability to analyze and solve complex problems. Traditional computer-implemented solutions have required extensive and specific programming, instructing the computer on the precise steps to be taken. This programming often needed to be tailored to the specific application at hand. Machine learning has allowed for automated or semi-automated processing of problems, reducing the need for human intervention. A primary use of machine learning techniques is in generating predictions based on a set of inputs. Supplied with a learning data set, a machine learning system may generate a predictive model based on the data set which may be used to generate generalized predictions based on similar input.

Models in machine learning systems may be based on one more features (e.g., inputs) in the data set. The features may be the factors that the model considers in generating predictions. For example, in a data set of annual income, age, and gender, a machine learning system may identify a model for predicting spending habits based on income alone, or on any combination of those features. In some instances, the machine learning system may evaluate candidate models based on different sets of features to determine an optimal feature set based on identifying a model that offers superior results. In this sense, features may be considered as parameters or inputs to the model.

The machine learning process may involve generating a set of candidate models, each using a different set of features. The fitness and/or accuracy of each candidate model may be evaluated, and the machine learning system may select models that exhibit desirable performance traits. Machine learning systems may utilize one or more hyper parameters when generating candidate models. Hyper parameter adjustments, such as increasing the learning rate, may be used to generate candidate models quickly, early on in the model development process. That is, it may inform the search for the best parameters for the model and refine on such a selection by lowering the learning rate in later phases of model development. In typical machine learning systems, hyper parameters are able to be tuned and/or adjusted by an operator of the machine learning system. By adjusting hyper parameters, the operator may influence the generation and hence evaluation of candidate models.

In traditional modelling methodologies, model features are selected and hyper parameters are optimized in independent stages, which may result in sub-optimal models. Beginning with a clean data set, the system may first attempt to identify an optimal feature set. For that feature set, the system may then tweak the hyper parameters used to identify an optimal model based on those features. Each hyper parameter set may lead to its own corresponding candidate model, and the system may select a final model from the candidate optimal models from the hyper parameter selection process.

A shortcoming of this methodology is that the 'optimal' feature set selected in the first step of processing may lose its optimality when the hyper parameters are changed during hyper parameter selection. And operators are typically unable to discern if feature selection methods are best suited for the machine learning algorithms used to develop the models until the models are built and candidate solutions are evaluated. As datasets increase in dimensionality, a more powerful approach to feature selection may be required that can efficiently search the corresponding larger solution space. A large number of potential feature sets may make the conventional combinatorial optimization model very complex.

Determining the best features to use in a model may depend on the machine learning algorithm that is employed in training a model. As a result, feature selection methods for boosting models may be optimized based on improving the determination of the best features that would be optimal for the boosting algorithm and maximize performance. One aspect of feature selection may include dimensionality reduction. Dimensionality reduction is the process of eliminating features from a set of potential independent variables in such a way to maximize the predictive performance of the learned model. If F is a set of all available features, the optimal set of predictor variables would be contained in the power set of F. The size of this solution space is $2^{|F|}$ which, in the context of searching, is NP hard. Hence, in problems where there are many features to choose from, exhaustively determining the optimal set of features quickly becomes computationally infeasible.

There are three main categories for methods of feature selection: filter, embedded, and wrapper. These are discussed in Isabelle Guyon, Andre Elisseeff, "An Introduction to Variable and Feature Selection," Journal of Machine Learning Research, pp. 1157-1182 (2003).

Filter methods of feature selection tend to utilize statistical inferences of a variable's correlation to the dependent. These methods are generally faster due to simplicity in computation. A major limitation with such approaches may be identifying interactions between independent variables. As such, it is common practice to utilize such methods before applying robust wrapper methods of feature selection.

Embedded methods may allow feature selection to occur as part of the training procedure, and operate as part of the learning algorithm in a system utilizing such methods. This may allow for improved efficiency and better utilization of data as there is no need to designate a validation set. One advantage of embedded methods may be a reduction in computation time, but they are usually specific to given learning machines.

Wrapper based methods may assume that the learning machine is a perfect black box to measure the relative usefulness of subsets of variables. This may allow the method to be applied to any type of machine learning algorithm. Each subset contains within it the influence of variable interactions that may not be captured through filter based methods and thus overcome this limitation. A limitation of this approach is that the computation required may be significantly higher than in filter based methods. However, some powerful search strategies may be parallelized thus overcoming this limitation.

When the solution space is small, it becomes possible to exhaustively search through all possible subsets and determine the optimal feature set for the learning machine by measuring the cross validated performance. However, the problem is known to be NP-hard, as discussed in Edoardo Amaldi, Viggo Kann, "On the approximability of minimizing nonzero variables or unsatisfied relations in linear systems," *Theoretical Computer Science*, Volume 209, pp. 237-260. (1998). Hence, any search strategy may become computationally intractable as |F| increases. As such, search strategies that can be parallelized are desired to overcome computational bottlenecks.

Highly correlated variables can still be valid parameters to use if it is the subtle differences between them are in itself, the predictors. A global search solution that can pick up on complex interactions between variables may be desirable to address this scenario. These subtle differences may be missed by traditional approaches of feature selection. Searching for global optima in large feature solution spaces may be complex, especially when combined with the hyper parameter space. Exhaustive feature selection on 1000 variables would result in 2^1000 possible solutions. With hyper parameter selections too, the size of the solution space goes up exponentially. Exhaustive approaches may take the fastest computers trillions of years to complete.

Efficient and robust search algorithms are desirable to navigate the enormous solution spaces corresponding to large data sets and hyper parameter optimization in a reasonable amount of time. As one example, in classification models, area under receiver operator characteristic curve (AUROC) is one measure of performance for a model. This measure may support evaluation of models using a probability rank ordering criteria, and may be desirable when appropriating marketing spend or directing/targeted ad campaigns in the domain of marketing. AUROC is a non-differentiable objective and is not suitable for optimization using gradient based optimization. Measures like AUROC that are non-differentiable objectives may require a non-convex approach to optimization such as stochastic optimization.

One type of stochastic optimization that may address some of these challenges employs evolutionary optimization. Evolutionary optimization techniques may utilize "evolutionary algorithms." This approach is based on observations regarding evolutionary biology, which may be considered nature's own stochastic optimization algorithm. Biological evolution is a powerful search algorithm; the solution space of which is as complex as all possible configurations of our DNA. This may make it an ideal and powerful approach to search vast solution spaces in computer science. The biological principles of generational breeding, genetic crossover and mutation, and others may be applied to candidate models and the learning process to discover an optimal model from a pool of candidate models.

Evolutionary optimization may allow for a balance of exploration and exploitation while carrying over a 'memory' through the optimization process of what works and what does not. These characteristics may make evolutionary optimization an ideal fit for large solution spaces that are not suitable to exhaustive exploration in reasonable time frames. Evolutionary algorithms are able to solve non-differentiable objectives. Because of parallelizability, they may overcome the clock speed bottlenecks associated with single processors and provide fast, scalable solutions. And, because evolutionary algorithms serve as a global search algorithm, complex interactions can be discovered that may otherwise be missed with traditional approaches to feature selection. However, evolutionary optimization may still require operator intervention to manually tune hyper parameters used to guide the machine learning process in its hunt for an optimal model.

Aspects described herein may address shortcomings in the prior art by performing optimization on feature selections and hyper parameters simultaneously. This may, according to some aspects, ensure that the "black box" in wrapper feature selection is optimal. This may allow the system to converge on models that may not be possible through conventional approaches where hyper-parameters and features are selected in independent stages.

SUMMARY

Aspects of the disclosure relate to a machine learning process using cycles to automatically determine the best hyper parameters while simultaneously identifying optimal feature sets through short bursts of genetic algorithm generations. In particular, aspects disclosed herein may provide an evolutionary boosting cycle with simultaneous optimization of feature selections and hyper parameters as illustrated in FIG. 4. These and other features may provide automated training of machine learning systems using evolutionary boosting machines.

According to some aspects, in a machine learning system implementing an evolutionary boosting machine, a cycle may begin with a first generation of candidate models each having a respective feature set. The system may initially select randomized feature sets for the model to generate an initial generation of a first cycle. The system may determine an optimal number of boosting iterations for each candidate model by building boosting iterations from an initial value up to a predetermined maximum number of boosting iterations. Later generations of the models may be generated by applying an evolution process to a current generation of models. Evolutionary algorithms may be applied to the system to create later generations of the cycle, crossing and mutating the feature selections of the candidate models. Mutation and crossover may have controls defined within the system that ensure the number of features may be kept lower than a predefined limit. The system may determine respective optimal boosting iteration values for candidate models of the new generation. When a final generation is achieved, the system may evaluate the optimal model of the generation. The optimal model may be used as input to a next cycle of the evolutionary boosting machine. If feature selection in the optimal model conforms to a target range for the optimal boosting iterations, the system may proceed to the next cycle. If the optimal boosting iterations of the optimal model does not meet constraints on the optimal boosting iterations the system may adjust a learning rate parameter and then proceed to the next cycle. The final generation of a first cycle may be used as and/or to generate the first generation of a following cycle. Based on some termination criteria, such as completion of a number of cycles, the system may determine a resulting/final optimal mode. The final optimal model may be used to generate predictions for target applications.

Aspects described herein may provide methods, devices, and/or computer readable media storing instructions for automatically optimizing hyper parameters and feature selection in a machine learning system. The method may comprise identifying a training data source comprising a plurality of records. Each record of the plurality of records may comprise data corresponding to a plurality of features. The machine learning system may initialize a first cycle by generating a first generation of candidate models. Generating each respective first candidate model of the first generation of candidate models may comprise selecting a first subset of features, of the plurality of features, for use in the first candidate model. Generating each respective first candidate model of the first generation of candidate models may comprise selecting the first subset of features randomly and based on a maximum allowed features constraint. The machine learning system may determine, for each first candidate model of the first generation of candidate models, a respective first optimal boosting iterations hyper parameter. Determining the first optimal boosting iterations hyper parameter for the first candidate model may be based on a maximum number of boosting iterations. For example, determining the first optimal boosting iterations hyper parameter for the first candidate model may comprise, for each number of boosting iterations between an initial number of boosting iterations and the maximum number of boosting iterations, evaluating fitness of the first candidate model using the number of boosting iterations and selecting the number of boosting iterations that provides a highest fitness for the first candidate model as the first optimal boosting iterations hyper parameter. The system may evaluate fitness values for each respective first candidate model in the first generation based on a corresponding subset of features and a corresponding optimal boosting iterations hyper parameter.

One or more cycles of the machine learning system may be performed by iteratively evaluating a plurality of generations of the machine learning system. Evaluating a respective generation of the machine learning system may comprise generating a second generation of candidate models by performing an evolution process on a respective subset of features associated with selected models of a current generation of candidate models to generate respective second candidate models. The evolution process may employ a crossover function configured to repair candidate solutions that exceed a maximum number of allowed features. The evolution process may employ a mutation function configured to reduce the number of features selected in a given candidate model. The system may determine, for each second candidate model of the second generation of candidate models, a respective second optimal boosting iterations hyper parameter. And the system may evaluate fitness values for each respective second candidate model in the second generation based on a corresponding subset of features and a corresponding optimal boosting iterations hyper parameter. According to some aspects, the system may perform at least one second cycle, wherein a first generation of the second cycle is generated based on a final generation associated with a first cycle.

Subsequent to iteratively evaluating the plurality of generations, such as at the end of a cycle, the system may determine a selected candidate model of a final generation of candidate models associated with the one or more cycles. The system may adjust a learning rate of the machine learning system based on the optimal boosting iterations hyper parameter of the selected candidate model. Adjusting a learning rate of the machine learning system may be based on determining whether the selected candidate model satisfies the solution constraint. Based on determining that the selected model does not satisfy the solution constraint, the system may adjust the learning rate of the machine learning system. The system may perform one or more additional cycles of the machine learning system employing the adjusted learning rate. Based on termination criteria, the system may identify a resulting candidate model of a final cycle of the machine learning system as an optimized model. The termination criteria may comprise a predetermined number of cycles of the machine learning system, and/or a threshold fitness value for the resulting candidate model. The resulting candidate model may be an output of at least one second cycle.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
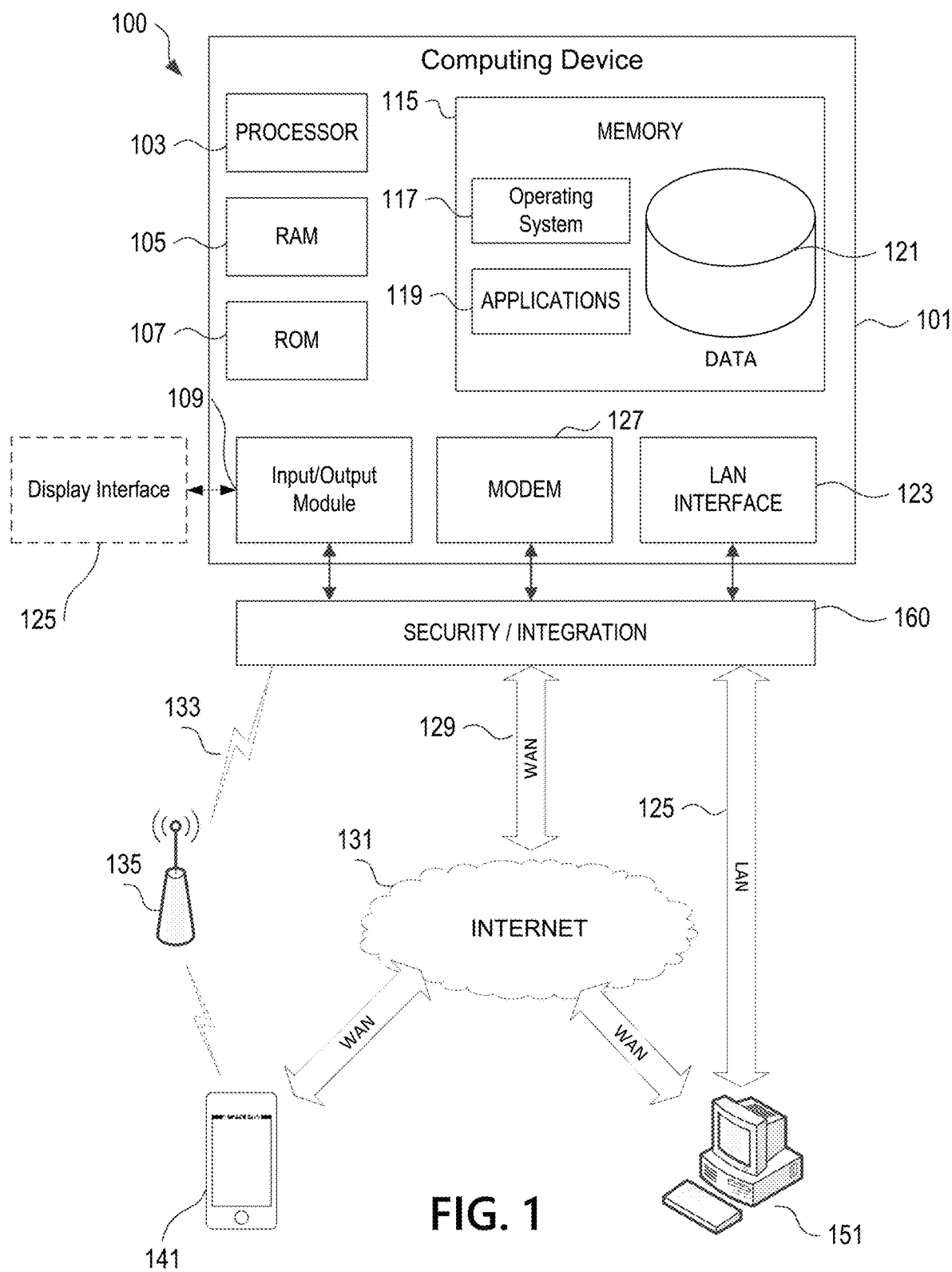
FIG. 1 provides an illustrative special purpose computing device through which various aspects of the disclosure may be implemented.

Aspects of the disclosure generally relate to machine learning systems employing evolutionary optimization, where cycles are used to simultaneously optimize feature selections and hyper parameters. In particular, various aspects described herein relate to determining optimal boosting iterations for each candidate model during generations of an evolutionary boosting machine.

One objective of predictive machine learning modeling may be to minimize error. Traditionally, developing such models may involve decisions around feature and hyper parameter selection. In situations where there are a large number of features to choose from, traditional filter methods of feature selection may become difficult to manage and may fail to capture complex interactions between independent variables. Wrapper methods of feature selection that may capture interactions between variables have been demonstrated to yield higher performance than filter based methods. Building boosting models using genetic algorithms to discover optimal features while simultaneously optimizing boosting iterations to control overfitting may lead to models that tend towards global optimum in large solution spaces. Since the algorithm may be run in parallel, the time to convergence can potentially be very short. Aspects described herein may provide a powerful approach that searches for optimal features for boosting models while simultaneously optimizing number of boosting iterations. Example implementations may seek maximum area under receiver operator characteristic curve (AUROC) in classification applications, or minimum root mean square error (RMSE) in regression applications.

As discussed above, traditional machine learning techniques involve the operator of the machine learning system performing feature selection as a first phase to identify a feature set to use. The feature set may then be fit to a machine learning system to produce a model. In the context of boosting, this involves running a boosting algorithm over a number of boosting iterations. The operator may pick the optimal number of boosting iterations for the preferred model, and use the preferred model and the determined number of boosting iterations as a resulting model. But this approach may present shortcomings because preferred model A may not offer the best fitness in the solution space after the optimal number of boosting iterations is considered. Higher numbers of boosting iterations may be associated with more complex feature sets and relationships, and a different model may offer better fitness than the preferred model as boosting iterations are increased. Aspects described herein may provide for simultaneous optimization of feature selection and boosting iterations. The system may determine an optimal number of boosting iterations for each candidate model of a generation in the evolutionary optimization process. A learning rate of the system may be adjusted dynamically based on a target optimal boosting iterations for the final model between cycles. And the target optimal boosting iterations may be increased in later cycles and/or phases to generate solutions providing a high level of accuracy. Aspects described herein may be particularly effective in automating portions of the machine learning process that have required operator supervision and configuration.

A machine learning system implementing an evolutionary boosting machine, according to some aspects, may employ cycles to iteratively refine candidate models and determine an optimized model for a given problem and learning set. A cycle may begin with a first generation of candidate models each having a respective feature set and a respective value of a hyper parameter. For example, the hyper parameter may be an amount of optimal iterations for genetic boosting algorithms. The system may select randomized feature sets for each candidate model of an initial generation, and may determine a respective optimal boosting iteration value for each candidate model of the generation. Evolutionary algorithms may be applied to the system to create later generations of the cycle, combining and mutating the feature selections of the candidate models. The system may determine respective optimal boosting iteration values for candidate models of the new generation.

When a final generation is achieved in a cycle, the system may evaluate the optimal model of the generation. At the end of a cycle, the system may determine a selected candidate model of a final generation of candidate models associated with the one or more cycles. The system may adjust a learning rate of the machine learning system based on the optimal boosting iterations hyper parameter of the selected candidate model, such as based on determining whether the selected candidate model satisfies a solution constraint wherein the optimal iterations are within a target range. Other solution constraints may include restraints of the feature selections, such as a maximum number of selected features. The system may perform one or more additional cycles of the machine learning system employing the adjusted learning rate. Based on termination criteria, the system may identify a resulting candidate model of a final cycle of the machine learning system as an optimized model. The optimized model may be used to generate predictions for target applications.

However, before discussing these and other aspects further, discussion will turn to an example machine learning device that may be used to implement one or more aspects described herein, as shown in FIG. 1.

FIG. 1 illustrates a block diagram of a machine learning device (or server) 101 in a computer system 100 (e.g., a machine learning system) that may be used according to one or more illustrative embodiments of the disclosure. The machine learning device 101 (also referred to as computing device 101) may be a specially configured computing device and may have one or more processors 103 for controlling overall operation of the machine learning device 101 and its associated components, including one or more memory units (e.g., RAM 105, ROM 107), an input/output module 109, and a memory 115. The machine learning device 101, along with one or more additional devices (e.g., terminals 141 and 151, security and integration hardware corresponding to an integration layer 160) may correspond to a machine learning system configured as described herein for simultaneously optimizing feature selections and hyper parameters in an evolutionary boosting machine.

The input/output (I/O) 109 may include one or more user interfaces, such as a microphone, keypad, touch screen, and/or stylus through which a user of the computing device 101 may provide input, and may also include one or more of a speaker for providing audio output and a video display device for providing textual, audiovisual and/or graphical output. For example, the input/output 109 may be communicatively coupled with a display interface 125. Display interface 125 may comprise any suitable display device, such as a monitor or display panel integrated into the computing device 101 in some embodiments. In other embodiments, display interface 125 may be associated with a user device in communication with the computing device 101 and operative to display results generated by the computing device 101. Software may be stored within memory 115 and/or storage to provide instructions to processor 103 for enabling computing device 101 to perform various actions. For example, memory 115 may store software used by the computing device 101, such as an operating system 117, application programs 119, and an associated database 121 (such as the room information and user information databases discussed further herein). The various hardware memory units in memory 115 may include volatile and nonvolatile, removable and non-removable media implemented in any method or technology for storage of information such as computer readable instructions, data structures, program modules or other data. The memory 115 also may include one or more physical persistent memory devices and/or one or more non-persistent memory devices. The memory 115 may include, but is not limited to, random access memory (RAM) 105, read only memory (ROM) 107, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by the processor 103.

The processor 103 may include a single central processing unit (CPU), which may be a single-core or multi-core processor (e.g., dual-core, quad-core, etc.), or may include multiple CPUs. In some cases, the processor 103 may have various bit sizes (e.g., 16-bit, 32-bit, 64-bit, 96-bit, 128-bit, etc.) and various processor speeds (ranging from 100 MHz to 5 Ghz or faster). The processor 103 and its associated components may allow the device 101 to execute a series of computer-readable instructions, for example, to generate a virtual room corresponding to a real world room and generate a list of recommended items for inclusion in the virtual room.

The computing device 101 (e.g., a user device, a server computer, etc.) may operate in a networked environment (e.g., the computing system 100) supporting connections to one or more remote computers, such as terminals 141 and 151. The terminals 141 and 151 may be personal computers, servers (e.g., web servers, database servers), clients, or mobile communication devices (e.g., mobile phones, portable computing devices, and the like), and may include some or all of the elements described above with respect to the computing device 101. In some cases, the terminals 141, 151 may be located at one or more different geographic locations, including, but not limited to, at a site associated with an insurance agent and/or agency and/or a site associated with an insurance provider. The network connections depicted in FIG. 1 include a local area network (LAN) 125 and a wide area network (WAN) 129, and a wireless telecommunications network 133, but may also include other networks. When used in a LAN networking environment, the computing device 101 may be connected to the LAN 125 through a network interface or adapter 123. When used in a WAN networking environment, the device 101 may include a modem 127 or other means for establishing communications over the WAN 129, such as network 131 (e.g., the Internet, a cellular network, and the like). When used in a wireless telecommunications network 133, the computing device 101 may include one or more transceivers, digital signal processors, and additional circuitry and software for communicating with wireless computing devices 141 (e.g., mobile phones, portable customer computing devices) via one or more network devices 135 (e.g., base transceiver stations) in the wireless telecommunications network 133.

Also illustrated in FIG. 1 is a security and integration layer 160, through which communications may be sent and managed between the computing device 101 and the remote devices (terminals 141 and 151) and remote networks (networks 125, 129, and 133). The security and integration layer 160 may comprise one or more computing devices, such as web servers, authentication servers, and various networking components (e.g., firewalls, routers, gateways, load balancers, etc.), having some or all of the elements described above with respect to the computing device 101. As an example, security and integration layer 160 may comprise a set of web application servers configured to use secure protocols and to insulate the computing device 101 (e.g., one or more servers, a workstation, etc.) from external devices (e.g., terminals 141 and 151). In some cases, the security and integration layer 160 may correspond to a set of dedicated hardware and/or software operating at the same physical location and under the control of same entities as the computing device 101. For example, the integration layer 160 may correspond to one or more dedicated web servers and network hardware in a data center or in a cloud infrastructure supporting a cloud-based application and/or process. In other examples, the security and integration layer 160 may correspond to separate hardware and software components which may be operated at a separate physical location and/or by a separate entity.

In some cases, the data transferred to and from computing device 101 may include secure and sensitive data, such as insurance customer and policy data. Therefore, it may be desirable to protect the data transmission by using secure network protocols and encryption, and also to protect the integrity of the data stored when on the computing device 101 using the security and integration layer 160 to authenticate users and restrict access to unknown or unauthorized users. In various implementations, security and integration layer 160 may provide, for example, a file-based integration scheme or a service-based integration scheme. In filed-based integration, data files may be transmitted to and from the computing device 101 through the security and integration layer 160, using various network communication protocols. Secure data transmission protocols and/or encryption may be used in file transfers to protect to integrity of the data, for example, File Transfer Protocol (FTP), Secure File Transfer Protocol (SFTP), and/or Pretty Good Privacy (PGP) encryption.

In service-based integration, one or more web services may be implemented within the system 100 between the computing device 101 and/or security and integration layer 160. The web services may be accessed by authorized external devices and users to support input, extraction, and manipulation of the data in the computing device 101. Web services built to support to the system 100 may be cross-domain and/or cross-platform, and may be built for enterprise use. Such web services may be developed in accordance with various web service standards, such as the Web Service Interoperability (WS-I) guidelines. In some examples, system web services may be implemented in the security and integration layer 160 using the Secure Sockets Layer (SSL) or Transport Layer Security (TLS) protocol to provide secure connections between the virtual reality visualization device 101 and various clients (e.g., terminals 141 and 151) attempting to access, insert and/or manipulate data within the system 100. SSL or TLS may use HTTP or HTTPS to provide authentication and/or confidentiality. In some cases, system web services may be implemented using the WS-Security standard, which provides for secure SOAP messages using XML encryption. In still other examples, the security and integration layer 160 may include specialized hardware for providing secure web services. For example, secure network appliances in the security and integration layer 160 may include built-in features such as hardware-accelerated SSL and HTTPS, WS-Security, and firewalls. Such specialized hardware may be installed and configured in the security and integration layer 160 in front of the web servers, so that any external devices may communicate directly with the specialized hardware.

Although not shown in FIG. 1, various elements within the memory 115 or other components in the system 100, may include one or more caches, for example, CPU caches used by the processing unit (e.g., the processor 103), page caches used by the operating system 117, disk caches of a hard drive, and/or database caches used to cache content from the database 121. For embodiments including a CPU cache, the CPU cache may be used by one or more processors in the processing unit (e.g., the processor 103) to reduce memory latency and access time. In such examples, a processor 103 may retrieve data from or write data to the CPU cache rather than reading/writing to memory 115, which may improve the speed of these operations. In some examples, a database cache may be created in which certain data from the database 121 may be cached in one or more separate smaller databases on an application server separate from the database server. For instance, in a multi-tiered application, a database cache on an application server can reduce data retrieval and data manipulation time by not needing to communicate over a network with a back-end database server. These types of caches and others may be included in various embodiments, and may provide potential advantages in certain implementations of the system 100.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computer devices and system components described herein may be configured to communicate using any of these network protocols or technologies.

Additionally, one or more application programs 119, such as a machine learning application and/or modules, may be used by the computing device 101 within the system 100, including computer executable instructions for simultaneously optimizing hyper parameters and feature selections in an evolutionary boosting machine.

Aspects of the disclosure may be described in the general context of computer-executable instructions, such as program modules, being executed by a computer. Generally, program modules include routines, programs, objects, components, data structures, etc. that perform particular tasks or implement particular abstract data types. The disclosure may also be practiced in distributed computing environments where tasks are performed by remote processing devices that are linked through a communications network. In a distributed computing environment, program modules may be located in both local and remote computer storage media including memory storage devices.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more non-transitory computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 2:
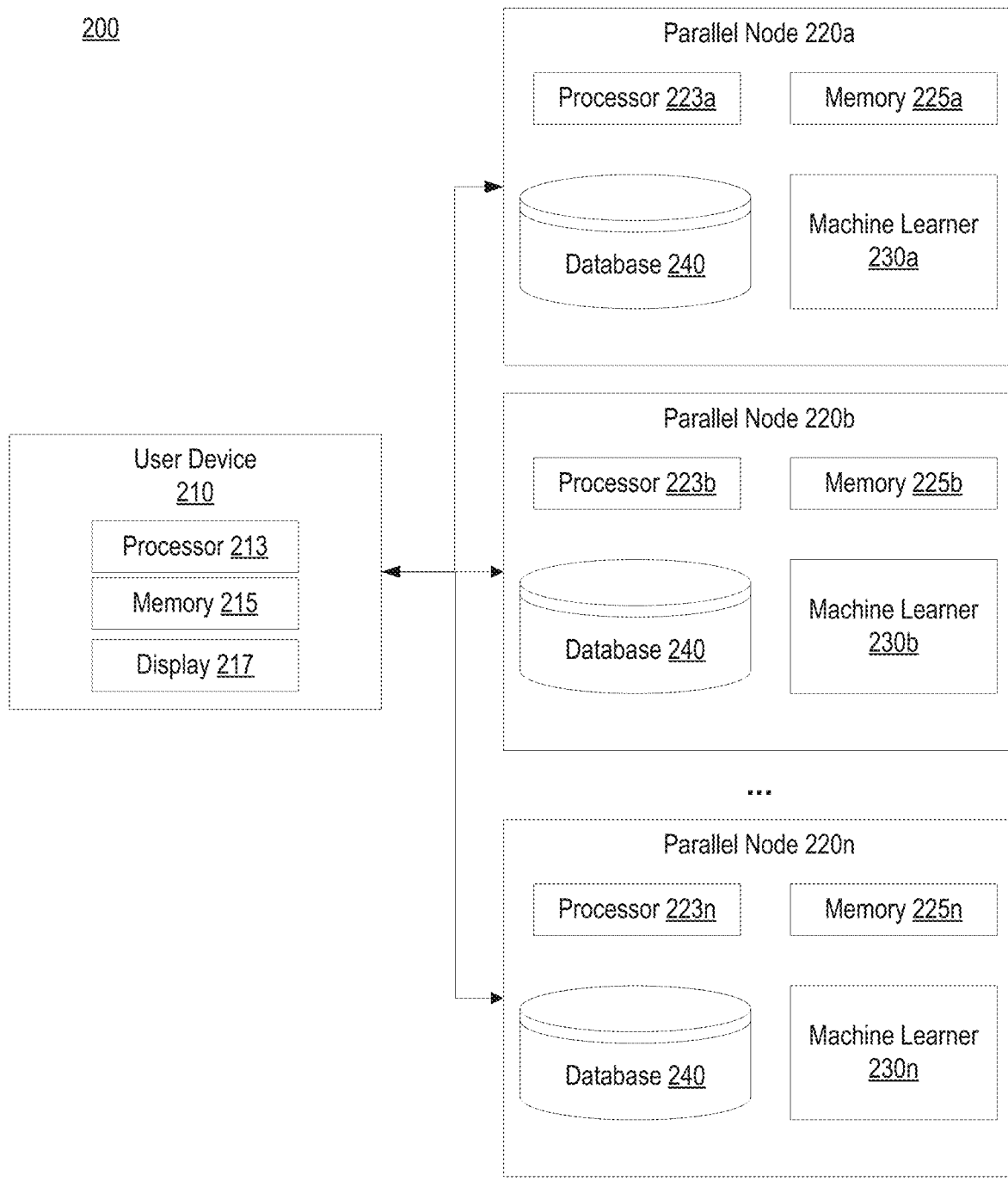
FIG. 2 provides an illustrative block diagram of a system that may be used to implement the processes and functions of certain aspects of the present disclosure.

Referring to FIG. 2, an illustrative system 200 for implementing methods according to the present disclosure is shown. In particular, system 200 may allow for parallel computing in a machine learning system. Aspects described herein may be particularly useful when operating on a solution space comprised of a large number of features. Where there are only a few features to select from, other methods might perform equally well or exhaustive search may be available. The fitness evaluation according to some aspects may be compute intensive. Accordingly, in some implementations the fitness evaluation may be done in parallel for each generation of the genetic algorithm. In an implementation, a population of size n makes use of n CPU cores. This may mean that each generation takes as long as one fitness evaluation. As computing hardware is moving towards parallelism, such approaches will become more common place and will in turn become increasingly more powerful.

System 200 may comprise parallel nodes 220a-220n. Parallel nodes 220a-220n may comprise processors 223a-n, memory 225a-n, databases 240 (which may be the same database, or different portions of a same database, etc.), and machine learning modules 230a-n. Collectively, parallel nodes 220a-220n may comprise a machine learning system that accepts commands from an operator. The parallel nodes 220a-220n may operate in concert to execute an evolutionary optimization routine to determine an optimal model based on training data in databases 240. Processing of the evolutionary boosting machine techniques described further herein may be parallelized such that processors 223a-223n may each perform a portion of the machine learning processing. For example, ideal performance might be achieved where system 200 has n CPU cores and each generation of the evolutionary boosting cycles has a population of corresponding size n.

User device 210 may allow an operator to issue commands to parallel nodes 220a-220n. User device 210 may comprise a processor 213, memory 215, and display 217. User device 210 may provide a user interface allowing the operator to configure aspects of the machine learning system, such as by setting solution constraints and/or hyper parameters used by the machine learning system. Results of the machine learning system may be provided to the operator via user device 210.

Figure 3A:
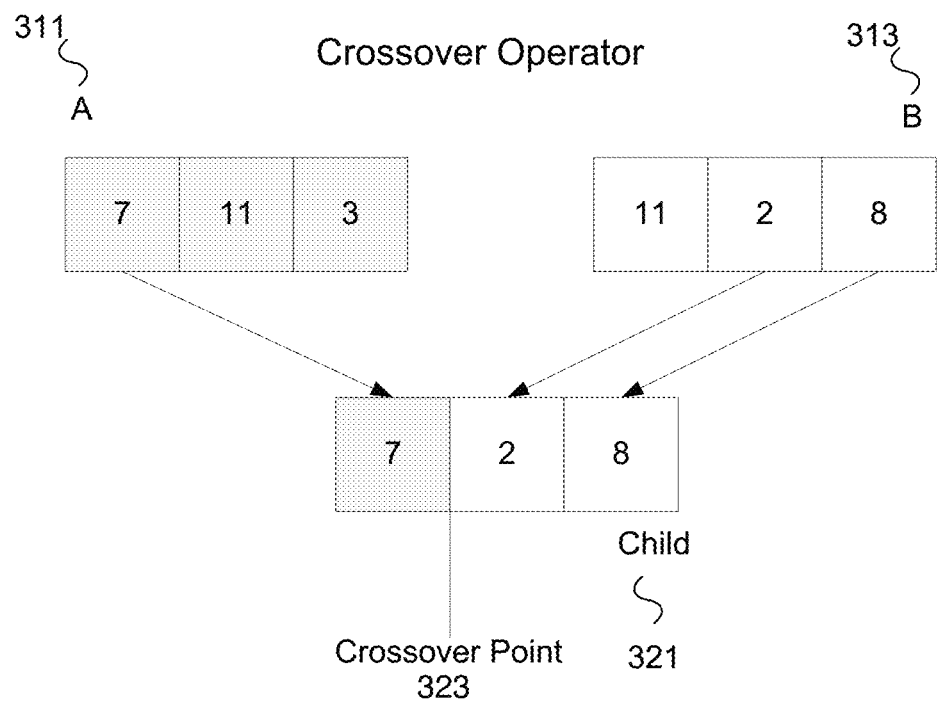
FIGS. 3A and 3B provide an illustrative diagram of evolutionary operators in accordance with certain aspects of the disclosure.
Figure 3B:
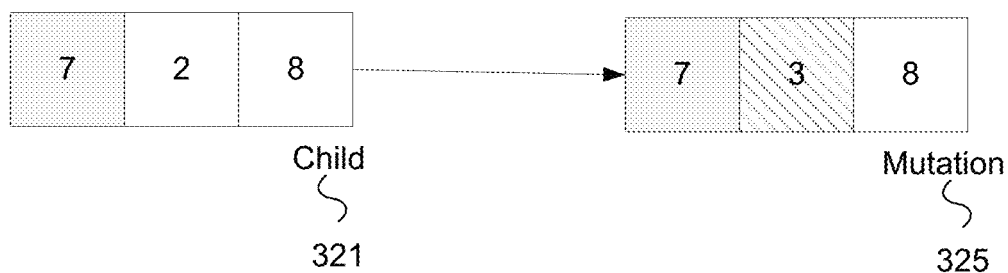
Figure 4:
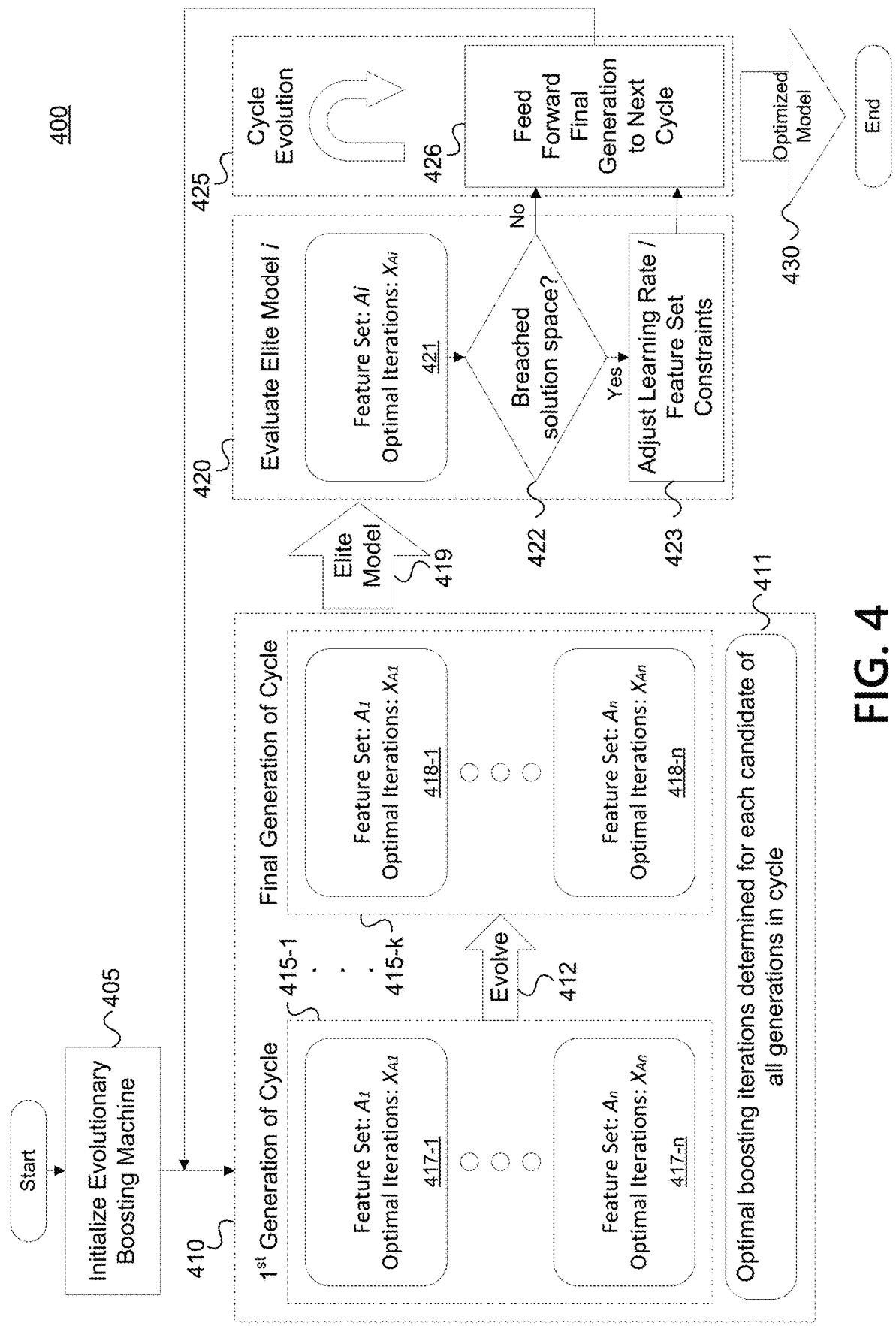
FIG. 4 provides an illustrative machine learning process in accordance with certain aspects of the disclosure.

Having discussed an illustrative special purpose computer and operating environment in which one or more aspects described herein may be implemented, a detailed discussion of one or more aspects will proceed with respect to cyclic evolutionary boosting machine techniques, the evolutionary operations illustrated in FIGS. 3A-3B, and the machine learning process illustrated in FIG. 4.

Aspects described herein relate to a machine learning system implementing an evolutionary boosting machine employing cycles to simultaneously optimize hyper parameters and feature selections. Evolutionary boosting machines may benefit from binary encoded genes identifying features selected in a candidate model. The boosting algorithms and evolutionary operators involved may allow the genepool of the machine learning system to maintain a memory of the current learning rate which is adjusted between generations based on evaluations of the best-known solution so far encountered, as described further herein.

Candidate models in the machine learning system may be defined based on the features selected for the model and/or hyper parameters associated with the model. An individual (chromosome) of the population (genepool) may contain a binary feature gene that is the instruction set used to select features for the model. The length of the feature gene may be the same as the number of features on which feature selection is performed. An on-bit may imply that the corresponding feature of the dataset is used whereas an off-bit may imply the feature is dropped. Some modules may have integer and real valued genes as constituents of the chromosome that dictate hyper parameter values where appropriate. Thus, in some embodiments, a candidate model may be defined by its "chromosome" which may be a list of the features that indicates which features have been selected for the given model. The chromosome may also include information about hyper parameter values used in the model, as appropriate. Some boosting algorithms may require that all training data be encoded numerically. Whether this is a requirement or not, better performance may be achieved when all categorical data is one-hot encoded (e.g., with on-bits set to 1 and off-bits set to 0) prior to the simulation while marking missing values in a separate category. This is because the feature selection may only pick up on the relevant parts of a categorical variable while dropping any noise.

Generating a chromosome (candidate model) as part of a generation may comprise feature selection. The machine learning system, according to some aspects, may utilize genetic algorithms that are designed specifically for wrapper based methods of feature selection. Feature selection processes may be subject to constraints, such as a specific number of features to be selected and/or minimum, maximum, or other limits on the number of features to be selected. In the interest of model parsimony and reducing the risk of overfitting, constraints may be applied to the subset size which set a hard limit as to how large a candidate feature gene solution can become. Candidate feature sets may be prevented from exceeding this pre-determined size which may be set by the modeler/operator. Solutions (e.g., candidate and/or elite models) may be penalized for attempting to utilize features that the boosting algorithm ignores when training. These variables tend to be highly correlated to another independent variable in the same solution or have no correlation to the dependent or have near zero variance. This may minimize the risk of selecting frivolous features that may lead to over fitting when the solution is scaled up to larger datasets. Using higher n-fold cross validation in the fitness evaluation may prevent the search from picking up on features that can contribute towards overfitting and is often a preferable way to do so if data is scarce.

An initial cycle of the evolutionary boosting machine may be created by performing random feature selection. Candidate models of a first/initial generation may be created by randomly selecting sets of features for the model's chromosome. Feature selection for initial generation models may be constrained based on a set number of features to be selected, and/or a maximum, minimum or other constraint of the number of features selected.

In evolutionary optimization techniques, chromosomes may be mutated and crossed with different genetic operators to evolve a genepool from one generation to the next. Aspects described herein may use a variety of genetic operators. For example, the genetic operators used during evolutionary optimization according to some aspects may include crossover and mutations like bit exchange, bit flip, on-bit reduction, and/or any suitable operators.

FIG. 3A illustrates an example of crossover, which is one type of genetic operator. Crossover operates to combine the chromosome of two "parents" by selecting a first chromosome portion of one parent and second chromosome portion of the chromosome of the other parent. The process for crossover may select a parent chromosome in the population at random and converts it to an offspring by obtaining a genetic imprint from another parent chromosome chosen at random. This allows the possibility of an offspring becoming a parent more than once in the same generation, creating offspring with more than two parents. Many different implementations are possible. The crossover operator may select one or more crossover points within the chromosomes and generate a child (e.g., next generation) candidate solution based on the features selected in the two parents. For example, in FIG. 3A the crossover operator is applied to parent A 311 and parent B 313. The feature values of the chromosomes illustrated are illustrative only, and in some implementation binary values are used to indicate whether each possible feature is on or off. One or more crossover points 323 may be selected randomly and/or based on model hyper parameters, and portions of the chromosome of parent A 311 and of parent B 313 may be combined to determine a chromosome for child 321. Crossover processes may cause the child to have more or less features than its parents, in some implementations.

Uniform crossover may be used in some implementations according to aspects described herein for purposes of convergence. However, if an upper limit on the number of features that can be selected in a candidate solution/model is provided, the crossover operator may be modified to check and deal with this situation. Thus, according to some aspects herein, the crossover operator may determine whether a resulting child chromosome (such as child chromosome 321) exceeds the upper bound (and/or other constraint). If the constraints for feature selection are violated, the crossover operator may adjust the chromosome to comply as part of a genetic repair process. For example, in some implementations the crossover operator may drop features randomly from the child chromosome until the solution is within the bounds of the constraint(s). An upper limit on the number of features that can be selected may preserve parsimony of the model, allowing the model to describe an event with fewer parameters. This may allow operators to manage complexity of the solution. Chromosome repair features may ensure parsimony. When two parents produce offspring, the evolutionary process may create a child that breaches solution constraints. The repair function of the evolutionary operators may address this breach, such as through mutation to randomly remove excess features until the parsimony goals are reached.

FIG. 3B illustrates an example of mutation, another type of genetic operator. Mutation may operate to randomly (or otherwise) adjust a feature selected as part of a candidate model, such as by changing the selected feature to be another feature. Mutation may serve at least two purposes in evolutionary boosting machines: exploration and model parsimony. Several types of mutation are possible, and the different types of mutations may have different probabilities of occurring. For example, mutation types may include bit-exchange, bit-flip and on-bit reduction. Three types of mutations are described here, though additional types are possible. In mutation, a chromosome may be chosen at random and one or more mutation types may be applied.

Bit-exchange may involve choosing an on bit at randomly and setting the chosen bit to off. Another randomly chosen off bit may be switched on. This may maintain the same number of features for the candidate chromosome while allowing exploration of similar but potentially better solutions.

Bit-flip may involve choosing a random bit and flipping it to its opposite state. An issue that might arise from only using a bit flip as mutation is when the limit of feature gene size is much smaller than the total number of available features. In such cases, this mutation may be more likely to add a feature to the solution than remove it, causing the candidate solution size to gravitate towards the feature gene limit.

On-bit reduction may involve choosing a random on bit and setting it to off. This may allow populations to drop features of candidate models that aren't useful, and may introduce pressure towards a reduction in the size of the feature set. This may be desirable because boosting algorithms can ignore certain variables during training. These ignored features tend to not affect the performance of the booster model causing the genetic algorithm to not eliminate them as their inclusion or exclusion results in the same fitness value.

FIG. 4 illustrates a machine learning process 400 employing evolutionary optimization methods, which may be implemented on a machine learning system. The machine learning process 400 may involve one or more evolutionary optimization cycles 410, evaluation and adjustment processes 420, and cycle evolution processes 425. The machine learning process 400 may utilize cycles to automatically determine the best hyper parameters while simultaneously identifying optimal feature sets. Generations of candidate models may be successively evolved to identify an elite candidate model. During each generation of the evolutionary optimization process, the machine learning system may determine an optimal boosting iteration for each candidate model of the generation.

At step 405, the machine learning system may initialize an evolutionary boosting machine and/or the evolutionary optimization process of the machine learning system. Initialization may include any suitable steps for preparing the machine learning system to begin evolutionary optimization and determination of an optimized model. Initialization may include identifying a training data source, such as a learning data set. The training data source may comprise a plurality of records. Each record in the training data source may comprise data corresponding to a plurality of features. For example, the training data source may include a record showing values of various features that correspond to a specific set of circumstances and their associated results. From this training data source, a machine learning system may generate a predictive model that is able to predict outcomes based on values for some subset of the features using a model.

An evolutionary optimization cycle 410 may comprise generating successive generations of candidate models. Initialization may comprise generating the first generation of the first cycle. For a first/initial generation 415-1 of a first cycle, the system may initialize the evolutionary boosting machine by randomly selecting features for n candidate models 417-1-417-n. System constraints on feature selection may be utilized to control the scope of the candidate models in the initial generation. Generating such an initial generation may comprise randomly selecting combinations of features from a feature set for use in a plurality of candidate models. Generation of the initial generation may be done using parameters specifying the number of features to be selected, and/or minimum, maximum, or other limits on the number and/or type of features to be selected. For example, a maximum number of selected features may be used to limit the complexity of the initial generation of candidate models. Each candidate model may have a selected feature set $A_1 \ldots A_n$. The selected feature set may correspond to an optimal boosting iterations hyper parameter $X_{A1} \ldots X_{An}$, according to aspects described herein. The machine learning system may, as part of processing the candidate models of a generation, determine 411 the optimal boosting iterations hyper parameter for the respective models. Each generation may be evolved using evolutionary algorithms to generate additional generations. The system will similarly determine optimal boosting iterations for each candidate model of successive generations.

During an evolutionary optimization cycle, the machine learning system may evolve 412 one generation to the next. For example, generation 415-1 may be evolved to generation 415-2. Similarly, generation 415-(k−1) may be evolved to a final generation 415-k, which may comprise final candidate models 418-1-418-n. Binary tournaments may be used to select the next generation of chromosomes from a current generation. This process may select two chromosomes at random from the current generation, and the fittest of the two are copied over to the next generation. The process may be repeated until the next generation is filled up to the genepool size limit established by the user. Genetic operations (e.g., crossover and mutation) may be used to generate additional candidate solutions up to the genepool size limit. For example, the system may take two candidate models of a current generation at random and cross them over to create a child. A certain percentage of candidate models may be selected as parents. In some implementations, rather than selecting parents with relatively higher fitness stochastically, the system may use elitism in the evolutionary processes by selecting of the fittest few candidates and copying them over to the next generation unchanged. Additionally, the system may apply mutation operators to generate mutations in some members of the genepool between generations. For example, a candidate model that uses education and income to make predictions may be mutated to add marital status as an additional and/or replacement feature.

Throughout the evolutionary optimization cycles and process, candidate models may be evaluated for fitness of the solution. Fitness of a candidate model may be determined using an evaluation function. This evaluation function may be used to evaluate the relative fitness of an individual boosting model. This may be done by first evaluating the objective at every value of boosting iterations up to the predetermined limit, thereby determining an optimal number of boosting iterations for the model. The optimal iterations may be determined as the number of boosting iterations which maximizes predictive performance for a given fold in the cross validation. Overall fitness for a candidate model may correspond to the fitness of the selected features at the optimal boosting iterations.

Fitness for binary classification models may be measured as the average cross validated area under receiver operator characteristic curve (AUROC) over a predetermined number of folds n. Whereas for regression, it may be measured as the average negation of root mean square error (RMSE) over n folds. A candidate booster model, $b_f$, may comprise a feature set A and optimal boosting iterations given that feature set $X_A$ for any fold. The boosting model $b_f$ may be specific to the training data as partitioned by fold f. The function perf may optimize a number of boosting iterations before providing the fold's performance. Thus, the objective may be formalized as:

$$\text{maximise} \sum_{f=0}^{n} perf(b_f)$$

By evaluating perf at optimal boosting iterations, the risk of overfitting may be significantly reduced while model parsimony may be realized. Model parsimony may be enforced by ensuring the features evaluated contribute to a gain in objective and if not, are ignored. This may also be because features that contribute towards overfitting/noise in later iterations may not be evaluated even if they are included in the solution. The downward pressure on number of features from the on-bit reduction mutation may cause features that contribute to overfitting/noise to be dropped as they are very likely to be excluded from the fitness evaluation and thus eliminated from further generations in the evolutionary process.

According to some aspects described herein, a machine learning system may perform one or more evolutionary boosting cycles 410 to generate a final optimized model 430. During each cycle 410 of the evolutionary boosting machine, the machine learning system may evaluate a plurality of candidate models (or candidate booster models) belonging to a generation based on some fitness evaluation function. Machine learning processes described herein may utilize boosting algorithms. Machine learning algorithms typically have error in their predictions. Boosting techniques may give additional weight to misclassification or errors so a next generation avoids those errors. Boosting weight of misclassifications or errors may improve the predictive value of the models during a next iteration of the optimization cycle. Boosting techniques may comprise an ensemble of other machine learning algorithms, for example decision tree boosting algorithms. Each machine learning algorithm in the ensemble may have a weight assigned. For example, in a model trying to predict whether a customer will purchase a product, purchasing customers may be marked as 1 while non-purchasing customers may be marked as 0. When training the model in the machine learning system, the system may attempt to maximize it predictive capability in each iteration. With boosting, an ensemble of decision trees may each have a weight assigned to their predictions. The weights may be added up over the ensemble. The ensemble algorithms may influence the generation of models, such as binary classification models. Some models may be misclassified. An additional tree may be built giving a high weight to misclassified models to try and solve the problem. Misclassified models from this additional tree may be further added to another additional tree, and the process is repeated. Each boosting iteration may increase the predictive capability of the model, for a time. But past a certain optimal point, further boosting iterations may lead to a decrease in the predictive capability of the model and additional boosting iterations may not provide further benefits while introducing an increased risk of overfitting noise.

The evolutionary boosting machine may determine, for each candidate model in a generation, an optimal number of boosting iterations hyper parameter. The machine learning system may evaluate each candidate model of a generation using a range of boosting iterations to determine the optimal number of boosting iterations hyper parameter. The machine learning system may be configured with a maximum number of boosting iterations to run for each model. For example, in some implementations the maximum number of boosting iterations may be 20 or 50. When evaluating the optimal number of boosting iterations for a candidate model, the machine learning system may evaluate the fitness of the model beginning at an initial boosting iterations value, such as 0 or 1. The machine learning system may evaluate the fitness of the model at incremental values between the initial boosting iterations value and the maximum number of boosting iterations. The number of boosting iterations that yields the highest fitness for the candidate model may be identified as the optimal number of boosting iterations for that candidate model.

A learning rate hyper parameter may be used in the machine learning system. Learning rates may control and/or influence the weight the machine learning system applies to new learning results during cycles of the evolutionary boosting machine. A lower learning rate may reduce variance of the solution. Reducing the learning rate may cause cycles to go slower, increasing the accuracy of the model. An evolutionary boosting cycle may comprise a number of genetic algorithm generations that maintain the same learning rate throughout while building up to a fixed number of boosting iterations for all candidates denoted as $l_p$, where p is the phase number, wherein each phase consists of several cycles. An evolutionary boosting cycle may comprise any suitable number of generations. The number of generations per cycle may be determined by system design, set by operator, determined based on cycle performance, and/or determined in any other suitable fashion. In some implementations, the evolutionary boosting cycle may comprise evaluation of five generations.

At step 420, the system may evaluate an elite model 421 resulting 419 from the cycle 410. Evaluation and adjustment process 420 may comprise the system determining 422 whether the elite model 421 breaches a solution space used by the machine learning system. If the elite model 421 violates the solution space, the system may adjust 423 the learning rate of the system and/or feature set constraints. Thus, at the end of a cycle the best performing model may be evaluated and checked against solution constraints. According to some aspects, solution constraints may include a maximum number of selected features and/or a target optimal boosting iterations range. Additional details of determination 422 will be discussed further with reference to FIG. 5, which relates to using a target optimal boosting iterations range.

Figure 5:
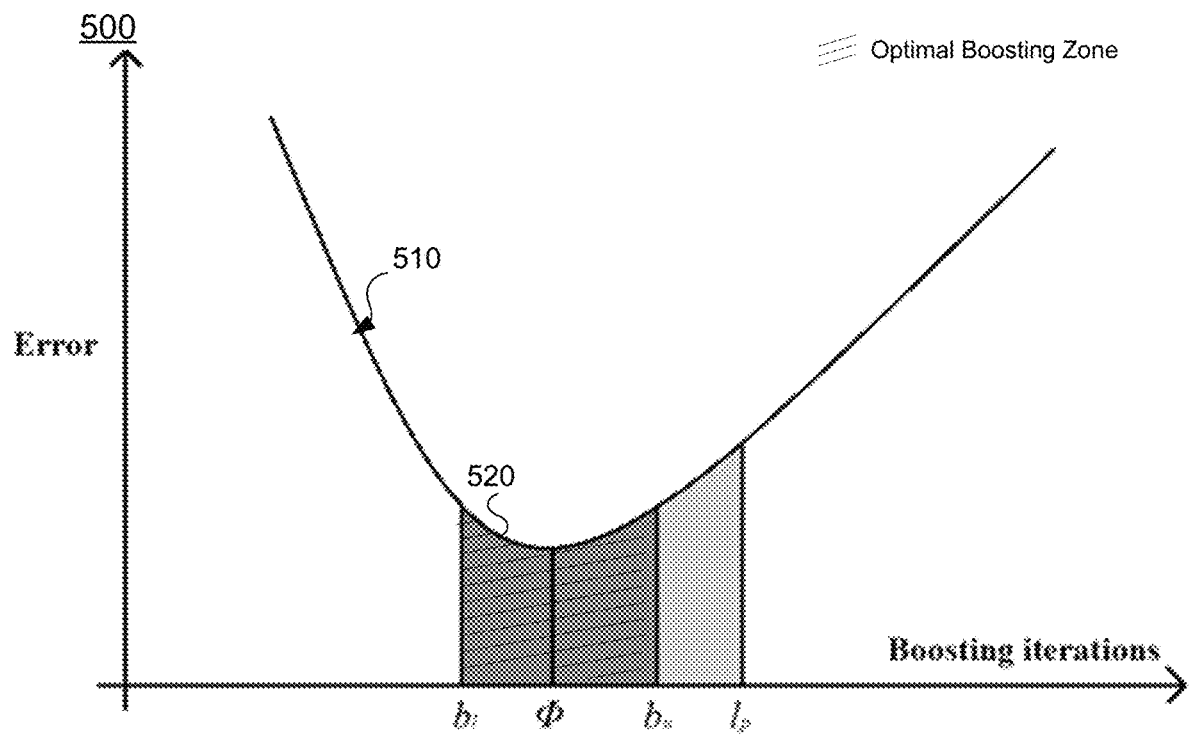
FIG. 5 provides an illustrative diagram related to use of solution constraints in a machine learning system in accordance with certain aspects of the disclosure.

Optimal boosting iterations may be correlated to learning rate in the machine learning system. According to some aspects the learning rate may be arbitrarily chosen at the start of the simulation and adjusted between evolutionary boosting cycles in such a way to keep optimal boosting iterations within a predefined boundary for the elite model. Increasing the learning rate early on in the process may save time while coming up with crude solutions, so that later on, modelers may refine on those solutions with a lower learning rate. According to some aspects, the system may manage lowering of learning rate automatically by ensuring that a boosting iteration constraint is not breached. Users may provide input regarding higher values for expected optimal boosting iterations, which may cause the system to automatically lower the learning rate in such a way so as to conform to the new constraint which is the range for where the new optimal boosting iterations should be. FIG. 5 illustrates error rates 510 and optimal boosting iterations c for a given model, and illustrates boundaries utilized to adjust the learning rate of the evolutionary boosting machine to achieve a desired value for the optimal boosting iterations hyper parameter. FIG. 5 illustrates an optimal boosting zone 520 used to constrain candidate elite models that result from cycles of the evolutionary boosting machine. Optimal boosting zone may be defined through an upper bound $b_u$ and a lower bound $b_l$. A maximum boosting iterations for a phase $l_p$ may control how many boosting iterations are built, and may serve as a constraint on the evaluation of the optimal boosting iterations for the elite model.

If an optimal boosting iterations hyper parameter of the elite model c falls outside the optimal boosting zone 520, the system may adjust the learning rate in the machine learning system for future cycles. The learning rate in boosting may determine how many boosting iterations would be required to reach optimal results without overfitting the model. Higher learning rates may mean less boosting iterations are required to reach optimal while taking less time to build. Conversely, a lower learning rate may require more boosting iterations to reach optimal, and hence more time to build.

This relationship may be difficult to be precisely known before any model development begins in the simulation. Therefore, according to some aspects the learning rate may be arbitrarily chosen at the start of the simulation and adjusted between evolutionary boosting cycles in such a way to keep optimal boosting iterations within a predefined boundary for the elite model. For this model, the fold with the highest number of optimal boosting iterations may be chosen for detecting this breach. The evolutionary process illustrated in FIG. 4 may be based on a single fold.

At the end of a cycle, the optimal number of boosting iterations of the best solution in the final generation, $\Phi$, may be used to determine if the learning rate caused a breach of the predetermined boundaries. If such a breach is detected, the learning rate may be adjusted for the next cycle to contain the breach. It may be desirable to converge to a solution that uses a lower learning rate. The simulation may be set up in phases, each comprising several cycles. As the simulation progresses through the phases, the number of boosting iterations built (e.g., the maximum number of boosting iterations) may be increased which may cause the learning rate to be automatically lowered by the breach detection logic. Use of multiple phases may save computation time as good solutions may be determined quickly with a high learning rate, and further improvements may be realized as learning rate decreases through increasing the number of built boosting iterations.

A machine learning objective according to some aspects described herein for cyclical evolution may be further formalized as:

$$\text{maximise} \sum_{f=0}^{n} perf(\Phi, fs) \text{ subject to:} \quad (1)$$

$$b_l < \Phi < b_u$$

$$|fs| < l_f \quad (2)$$

Constraint (1) may ensure that the optimal iterations exist within the boundaries that are set slightly lower than $l_p$. Since optimal iterations may vary over the folds, this constraint may only be applied to the highest value of all folds. As such, all other folds may have $\Phi$ contained within $l_p$. Constraint (2) may ensure that no feature set size exceeds $l_f$ (e.g., a maximum feature selection size). In cases where a feature set exceeds the maximum size for feature sets, the chromosome may undergo repair before any evaluation occurs.

The assumption made is that the elite model's optimal number of boosting iterations, $\Phi$, will be contained within $l_p$. For example, because boosting iterations are evaluated up to the maximum number of boosting iterations ($l_p$), the system may identify a number in the range of (0 . . . $l_p$) as the optimal number of boosting iterations. This assumption may very well be wrong, especially for the first few cycles. Upper and lower boundaries are set lower than the number of boosting iterations used to build each model and are denoted as $b_u$ and $b_l$ respectively. $b_u$ and $b_l$ may, in some embodiments, be set based on a percentage of the maximum boosting iterations. For example, the boundaries may be set 20% +/−5% lower than the maximum boosting iterations. For example, in an implementation $l_p$ may be set to 20, while $b_u$ may be set to 17 and $b_l$ may be set to 15. If the optimal boosting iterations breach the lower boundary, the learning rate may be decreased. Conversely, if the upper boundary is breached, the learning rate may be increased. As such, the relationship between boosting iterations and learning rate may be ascertained in the first few cycles and may be unlikely to change in later phases of the simulation. This may have the effect of adjusting the learning rate until optimal boosting iterations c falls within the optimal boosting range 520. This may ensure that features are evaluated correctly with a properly configured black box booster model. Proper adjustment of the learning rate to constrain optimal boosting iterations of the elite models may facilitate simultaneous optimization of hyper parameter and feature selections.

Returning to FIG. 4, after the elite model 421 has been evaluated against the solution constraints, the system may prepare the next cycle and/or phase of the evolutionary boosting machine in cycle evolution process 425. Cycle evolution process 425 may feed the final generation 415-$k$ of a cycle forward into the next evolutionary optimization cycle 410, with an adjusted learning rate or feature set constraints as indicated during the evaluation and adjustment process 420. The elite model may be included in the final generation fed forward into the new cycle. In some implementations, evolutionary processes may be employed to determine which members of the final generation are carried forward to the first generation of the new cycle. System hyper parameters may be configured to converge towards an elite model with a high number of optimal boosting parameters and a low learning rate. The solution constraints checked in step 422 and corresponding adjustments in step 423 may cause elite models that breach the solution space to be disfavored in later cycles.

To facilitate automations that do not require monitoring, the simulation search parameters may be configured so that the run time and quality of the final model may easily be controlled even before the simulation begins. This may allow establishing a relationship between simulation run time and quality. $l_p$ may set a limit on the number of boosting iterations evaluated for each model, which in turn may influence the time taken for a cycle. According to some aspects, $l_p$ may be an operator specified value. $l_p$ may vary between cycles and/or phases. The operator may be provided the option of breaking the simulation into phases starting with a low value for $l_p$ and moving to a higher value for $l_p$. For example, $l_p$ may be increased during later phases to drive the evolutionary boosting machine towards a lower learning rate. This may reduce run time for the overall simulation.

The size of the dataset used by the machine learning system may be increased over the phases to save computation time. For example, an early phase may start with a smaller training set (e.g., a subset of the full training data set) while later phases employ a larger training set (e.g., the full training data set). This may be particularly useful in reducing computation time without imposing a significant accuracy penalty on the system. For many problems, it may be assumed that a small, but substantial, amount of data would suffice in determining important features (e.g., in early phases with a high learning rate) and any additional data is less likely to change the optimal feature set or only in a very minor way (e.g., in later phases with a lower learning rate). The amount of data sufficient to determine important model features (e.g., in early phases) may be domain specific. An operator may assist the machine learning system by configuring the system to use an appropriate data set in early and later phases based on characteristics of the problem domain and/or desired solution characteristics.

Once a predetermined number of cycles have been performed, or other termination criteria are met, the evolutionary boosting machine may determine that an elite model of a final cycle correspond to an optimized model 430. If an optimized model is identified in evaluation process 420 and/or cycle evolution process 425, or if solution parameters are satisfied, the system may determine it has identified an optimized model 430 and end processing. Typically, the system may perform a predetermined number of cycles as configured by an operator and accept the final elite model as the optimized model 430. In an example implementation, the system may perform 30 cycles as part of a phase of the evolutionary boosting machine. As an example, 30 cycles may be appropriate for data sets comprising 5000 features wherein feature set size is constrained to a maximum limit of 60. Performance increases may be limited after 40 cycles, in example implementations.

At the end of the simulation, the parameters of the best model from the final cycle may be used to build a final model. The final model solution may use all the data available and have its learning rate reduced by dividing with a user provided value to build a better model using the same features while multiplying $l_p$ in such a way to contain the new optimal boosting iterations dictated by the new learning rate. This may be done because it may not be known what the final learning rate will be, and the operator may only be able to control where optimal iterations would lie in the final model by dividing the learning rate and multiplying $l_p$ respectively. The final model may be output by the system and used to make predictions regarding inputs in the problem space. For example, if the problem space comprises predicting whether a user will make a purchase, the final model may take as input user attributes and make a prediction based on the features selected in the final model.

Aspects described herein may apply to gradient boosting machines. For example, some implementations of aspects described herein have utilized XGBoost and light GBM. Aspects may be applied to similar boosting algorithms where the determination of optimal boosting iterations may be required for a fair evaluation of a candidate feature set.

Aspects of the disclosure have been described in terms of illustrative embodiments thereof. Numerous other embodiments, modifications and variations will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure. Additionally, those skilled in the art will appreciate that there are numerous variations and permutations of the above-described systems and techniques that fall within the spirit and scope of the invention as set forth in the appended claims.

What is claimed is:

1. A method for automatically optimizing hyper parameter and feature selection in a machine learning system, the method comprising:
   identifying a training data source comprising a plurality of records, wherein each record of the plurality of records comprises data corresponding to a plurality of features;
   initializing a first cycle of the machine learning system by generating a first generation of candidate models, wherein generating each respective first candidate model of the first generation of candidate models comprises selecting a first subset of features, of the plurality of features, for use in the first candidate model;
   determining, for each first candidate model of the first generation of candidate models, a respective first optimal boosting iterations hyper parameter;
   evaluating fitness values for each respective first candidate model in the first generation based on a corresponding subset of features and a corresponding optimal boosting iterations hyper parameter;
   performing one or more cycles of the machine learning system by iteratively evaluating a plurality of generations of the machine learning system, wherein evaluating a respective generation of the machine learning system comprises:
     generating a second generation of candidate models by performing an evolution process on a respective subset of features associated with selected models of a current generation of candidate models to generate respective second candidate models;
     determining, for each second candidate model of the second generation of candidate models, a respective second optimal boosting iterations hyper parameter; and
     evaluating fitness values for each respective second candidate model in the second generation based on a corresponding subset of features and a corresponding optimal boosting iterations hyper parameter;
   subsequent to iteratively evaluating the plurality of generations, determining a selected candidate model of a final generation of candidate models associated with the one or more cycles;
   determining that the selected candidate model breaches a solution constraint, wherein the solution constraint defines a threshold number of selected features and a target optimal boosting iterations range, and the breach is determined when evaluation of the selected candidate model produces a solution that does not satisfy the solution constraint;
   adjusting a learning rate of the machine learning system and a subset of features in response to determining that the selected candidate model breaches the solution constraint;
   performing one or more additional cycles of the machine learning system employing the adjusted learning rate and the adjusted subset of features; and
   based on termination criteria, identifying a resulting candidate model of a final cycle of the machine learning system as an optimized model.

2. The method of claim 1, comprising:
   performing at least one second cycle of the machine learning system, wherein a first generation of the at least one second cycle is generated based on a final generation associated with the first cycle,
   wherein the resulting candidate model is an output of the at least one second cycle.

3. The method of claim 1, wherein the termination criteria comprises a predetermined number of cycles of the machine learning system.

4. The method of claim 1, wherein the termination criteria comprises a threshold fitness value for the resulting candidate model.

5. The method of claim 1, wherein generating each respective first candidate model of the first generation of candidate models comprises:
   selecting the first subset of features randomly and based on a maximum allowed features constraint.

6. The method of claim 1, wherein determining the first optimal boosting iterations hyper parameter for the first candidate model is based on a maximum number of boosting iterations.

7. The method of claim 6, wherein determining the first optimal boosting iterations hyper parameter for the first candidate model comprises:
- for each number of boosting iterations between an initial number of boosting iterations and the maximum number of boosting iterations, evaluating fitness of the first candidate model using the number of boosting iterations; and
- selecting the number of boosting iterations that provides a highest fitness for the first candidate model as the first optimal boosting iterations hyper parameter.

8. The method of claim 1, wherein the evolution process employs a crossover function configured to repair candidate solutions that exceed a maximum number of allowed features.

9. The method of claim 1, wherein the evolution process employs a mutation function configured to reduce a number of features selected in a given candidate model.

10. A machine learning system, comprising:
- one or more processors; and
- memory storing instructions that, when executed by the one or more processors, cause the machine learning system to optimize hyper parameter and feature selection by causing the machine learning system to:
  - identify a training data source comprising a plurality of records, wherein each record of the plurality of records comprises data corresponding to a plurality of features;
  - initialize a first cycle by generating a first generation of candidate models, wherein generating each respective first candidate model of the first generation of candidate models comprises selecting a first subset of features, of the plurality of features, for use in the first candidate model;
  - determine, for each first candidate model of the first generation of candidate models, a respective first optimal boosting iterations hyper parameter;
  - evaluate fitness values for each respective first candidate model in the first generation based on a corresponding subset of features and a corresponding optimal boosting iterations hyper parameter;
  - perform the first cycle by iteratively evaluating a plurality of generations of the machine learning system, wherein evaluating a respective generation of the machine learning system comprises:
    - generating a second generation of candidate models by performing an evolution process on a respective subset of features associated with selected models of a current generation of candidate models to generate respective second candidate models;
    - determining, for each second candidate model of the second generation of candidate models, a respective second optimal boosting iterations hyper parameter; and
    - evaluating fitness values for each respective second candidate model in the second generation based on a corresponding subset of features and a corresponding optimal boosting iterations hyper parameter;
  - subsequent to iteratively evaluating the plurality of generations, determine a selected candidate model of a final generation of candidate models of the first cycle;
  - determine that the selected candidate model breaches a solution constraint, wherein the solution constraint defines a threshold number of selected features and a target optimal boosting iterations range, and the breach is determined when evaluation of the selected candidate model produces a solution that does not satisfy the solution constraint;
  - adjust a learning rate of the machine learning system and a subset of features in response to determining that the selected candidate model breaches the solution constraint;
  - perform one or more second cycles employing the adjusted learning rate and the adjusted subset of features, wherein a first generation of at least one second cycle of the one or more second cycles is generated based on the final generation of the first cycle; and
  - based on termination criteria, identify a resulting candidate model of a final cycle of the one or more second cycles as an optimized model.

11. The system of claim 10, wherein the termination criteria comprises a predetermined number of cycles of the machine learning system.

12. The system of claim 10, wherein the instructions cause the machine learning system to determine the first optimal boosting iterations hyper parameter for the first candidate model based on a maximum number of boosting iterations.

13. The system of claim 12, wherein the instructions cause the machine learning system to determine the first optimal boosting iterations hyper parameter for the first candidate model by causing the machine learning system to:
- for each number of boosting iterations between an initial number of boosting iterations and the maximum number of boosting iterations, evaluate fitness of the first candidate model using the number of boosting iterations; and
- select the number of boosting iterations that provides a highest fitness for the first candidate model as the first optimal boosting iterations hyper parameter.

14. The system of claim 10, wherein the evolution process employs:
- a first evolutionary operator configured to repair candidate solutions that exceed a maximum number of allowed features; and
- a second evolutionary operator configured to reduce a number of features selected in a given candidate model.

15. One or more non-transitory computer readable media storing instructions that, when executed by one or more processors, cause a machine learning system to perform steps comprising:
- identifying a training data source comprising a plurality of records, wherein each record of the plurality of records comprises data corresponding to a plurality of features;
- initializing a first cycle of the machine learning system by generating a first generation of candidate models, wherein generating each respective first candidate model of the first generation of candidate models comprises selecting a first subset of features, of the plurality of features, for use in the first candidate model;
- determining, for each first candidate model of the first generation of candidate models, a respective first optimal boosting iterations hyper parameter;

evaluating fitness values for each respective first candidate model in the first generation based on a corresponding subset of features and a corresponding optimal boosting iterations hyper parameter;

performing one or more cycles of the machine learning system by iteratively evaluating a plurality of generations of the machine learning system, wherein evaluating a respective generation of the machine learning system comprises:
   generating a second generation of candidate models by performing an evolution process on a respective subset of features associated with selected models of a current generation of candidate models to generate respective second candidate models;
   determining, for each second candidate model of the second generation of candidate models, a respective second optimal boosting iterations hyper parameter; and
   evaluating fitness values for each respective second candidate model in the second generation based on a corresponding subset of features and a corresponding optimal boosting iterations hyper parameter;

subsequent to iteratively evaluating the plurality of generations, determining a selected candidate model of a final generation of candidate models associated with the one or more cycles;

determining that the selected candidate model breaches a solution constraint, wherein the solution constraint defines a threshold number of selected features and a target optimal boosting iterations range, and the breach is determined when evaluation of the selected candidate model produces a solution that does not satisfy the solution constraint;

adjusting a learning rate of the machine learning system and a subset of features in response to determining that the selected candidate model breaches the solution constraint;

performing one or more additional cycles of the machine learning system employing the adjusted learning rate and the adjusted subset of features; and based on termination criteria, identifying a resulting candidate model of a final cycle of the machine learning system as an optimized model.

16. The computer readable media of claim 15, wherein the instructions cause the machine learning system to determine the first optimal boosting iterations hyper parameter for the first candidate model by causing the machine learning system to:
   for each number of boosting iterations between an initial number of boosting iterations and a maximum number of boosting iterations, evaluate fitness of the first candidate model using the number of boosting iterations; and
   select the number of boosting iterations that provides a highest fitness for the first candidate model as the first optimal boosting iterations hyper parameter.

17. The computer readable media of claim 15, wherein the evolution process employs:
   a first evolutionary operator configured to repair candidate solutions that exceed a maximum number of allowed features; and
   a second evolutionary operator configured to reduce a number of features selected in a given candidate model.

* * * * *

UNITED STATES PATENT AND TRADEMARK OFFICE
CERTIFICATE OF CORRECTION

PATENT NO. : 12,001,931 B2
APPLICATION NO. : 16/219242
DATED : June 4, 2024
INVENTOR(S) : Ousef Kuruvilla It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1107 days.

Signed and Sealed this
Third Day of June, 2025

Coke Morgan Stewart
*Acting Director of the United States Patent and Trademark Office*